US011983152B1

(12) United States Patent
Basu et al.

(10) Patent No.: US 11,983,152 B1
(45) Date of Patent: May 14, 2024

(54) SYSTEMS AND METHODS FOR PROCESSING ENVIRONMENTAL, SOCIAL AND GOVERNANCE DATA

(71) Applicant: BlackRock, Inc., New York, NY (US)

(72) Inventors: Debarshi Basu, Scarsdale, NY (US); Jaime Maihuire, New York, NY (US)

(73) Assignee: BlackRock, Inc., New York, NY (US)

( * ) Notice: Subject to any disclaimer, the term of this patent is extended or adjusted under 35 U.S.C. 154(b) by 0 days.

(21) Appl. No.: 17/872,889

(22) Filed: Jul. 25, 2022

(51) Int. Cl.
*G06F 16/215* (2019.01)
*G06F 11/07* (2006.01)
*G06F 16/22* (2019.01)

(52) U.S. Cl.
CPC ........ *G06F 16/215* (2019.01); *G06F 11/0787* (2013.01); *G06F 16/2272* (2019.01)

(58) Field of Classification Search
CPC . G06F 16/215; G06F 11/0787; G06F 16/2272
USPC ....................................................... 707/692
See application file for complete search history.

(56) References Cited

U.S. PATENT DOCUMENTS

| | | | | |
|---|---|---|---|---|
| 10,409,789 B2* | 9/2019 | Zoll | ................. | G06F 16/215 |
| 11,709,910 B1* | 7/2023 | Prieditis | ................. | G16H 10/60 |
| | | | | 703/2 |
| 2005/0055257 A1* | 3/2005 | Senturk | .............. | G06Q 30/0201 |
| | | | | 705/7.11 |
| 2005/0234688 A1* | 10/2005 | Pinto | ...................... | G05B 17/02 |
| | | | | 703/13 |
| 2009/0177598 A1* | 7/2009 | Bhaskar | ................. | G06N 3/126 |
| | | | | 706/13 |
| 2012/0023045 A1* | 1/2012 | Steck | ..................... | G06N 20/00 |
| | | | | 706/20 |
| 2012/0136896 A1* | 5/2012 | Tseng | ..................... | G06F 17/18 |
| | | | | 707/E17.014 |
| 2013/0036082 A1* | 2/2013 | Natarajan | .............. | G06Q 30/00 |
| | | | | 706/50 |
| 2015/0058337 A1* | 2/2015 | Gordon | .................... | G06N 7/01 |
| | | | | 707/769 |
| 2015/0073932 A1* | 3/2015 | Nice | .................. | G06Q 30/0631 |
| | | | | 705/26.7 |
| 2017/0132509 A1* | 5/2017 | Li | ........................... | G06N 3/045 |

(Continued)

FOREIGN PATENT DOCUMENTS

| | | | | |
|---|---|---|---|---|
| CN | 112464289 A | * | 3/2021 | |
| CN | 113127469 A | * | 7/2021 | ........... G06F 16/215 |

(Continued)

OTHER PUBLICATIONS

Koren et al., "Matrix Factorization Techniques for Recommender Systems", Computer, vol. 42, Issue 8, Aug. 2009, pp. 30-37. (Year: 2009).*

(Continued)

*Primary Examiner* — Phuong Thao Cao
(74) *Attorney, Agent, or Firm* — Haynes and Boone, LLP (57) ABSTRACT

Systems, methods, and computer program products described herein for building a prediction model with varying availability. Embodiments described herein build a prediction model that is initially trained with a selected subset of data characteristics (e.g., data characteristics that are commonly available in training data), and then augmented via Bayesian estimation with additional data characteristics when such data characteristics are available.

20 Claims, 8 Drawing Sheets

(56) References Cited

U.S. PATENT DOCUMENTS

| | | | |
|---|---|---|---|
| 2017/0316008 A1* | 11/2017 | Srinivasan | G06N 20/00 |
| 2018/0167153 A1* | 6/2018 | Cui | H04N 21/4383 |
| 2018/0173501 A1* | 6/2018 | Srinivasan | G06Q 10/063112 |
| 2020/0082283 A1* | 3/2020 | Moon | G06N 5/04 |
| 2020/0160215 A1* | 5/2020 | Kotnis | G06N 20/10 |
| 2020/0314119 A1* | 10/2020 | Karin | H04L 63/1408 |
| 2020/0333170 A1* | 10/2020 | Uwano | G06F 16/215 |
| 2021/0075875 A1* | 3/2021 | Liu | G06N 3/084 |
| 2021/0304047 A1* | 9/2021 | Alattas | G06N 7/01 |
| 2022/0004528 A1* | 1/2022 | Medisetti | G06N 20/20 |
| 2022/0058663 A1* | 2/2022 | Cui | G06F 18/10 |
| 2022/0067610 A1* | 3/2022 | Aggarwal | G06N 3/045 |
| 2022/0083532 A1* | 3/2022 | Solari | G06N 5/04 |
| 2022/0107872 A1* | 4/2022 | Kondrashkin | G06F 18/2113 |

FOREIGN PATENT DOCUMENTS

| | | | | |
|---|---|---|---|---|
| CN | 113806349 A | * | 12/2021 | |
| CN | 114090561 A | * | 2/2022 | |
| CN | 114153829 A | * | 3/2022 | |
| DE | 102014108191 A1 | * | 12/2014 | G06F 17/245 |
| WO | WO-2005106656 A2 | * | 11/2005 | G06Q 10/04 |

OTHER PUBLICATIONS

Le Morvan et al., "What's a Good Imputation to Predict with Missing Values?", 35th Conference on Neural Information Processing Systems (NeurIPS 2021), Nov. 30, 2021, pp. 1-21. (Year: 2021).*

Wang et al., "Correction of Bias from Non-Random Missing Longitudinal Data Using Auxiliary Information", Statistics in Medicine, 2010, 29(6): pp. 671-679. (Year: 2010).*

* cited by examiner

Missing values 402

Non-Missing values 403

MCAR 410

Whether the missing values are random or systemic? 405

Figure 4

Table 1. Little's MCAR test on Descriptor using non-binary variables

| Features | Clean Technology | Energy Management | Energy Production | Waste Management | Water Management |
|---|---|---|---|---|---|
| Chi-square distance | 41196.31823 | 121576.97 | 23325.31 | 196547.07 | 71949.83 |
| Degrees of Freedom | 9640 | 46581 | 2096 | 28112 | 9547 |
| Prob> chi-square | 0 | 0 | 0 | 0 | 0 |
| Features | Audit Tax &Risk Mgm | Board Effectiveness | Board Independence | Business Ethics | Ownership Control |
| Chi-square distance | 11354.1 | 11809.0 | 27762.1 | 25479.3 | 7501.6 |
| Degrees of Freedom | 179 | 156 | 467 | 642 | 132 |
| Prob> chi-square | 0 | 0 | 0 | 0 | 0 |
| Features | Community Relation | Culture | Customer Relations | Talent Management | Worker's Right |
| Chi-square distance | 16231.6 | 37006.9 | 12968.0 | 9361.5 | 135186.8 |
| Degrees of Freedom | 870 | 4371 | 940 | 546 | 34385 |
| Prob> chi-square | 0 | 0 | 0 | 0 | 0 |

SYSTEMS AND METHODS FOR PROCESSING ENVIRONMENTAL, SOCIAL AND GOVERNANCE DATA

TECHNICAL FIELD

The disclosure generally relates to statistical models, and more specifically to systems and methods for imputing missing values in environmental, social and governance (ESG) data.

BACKGROUND

Financial institutions and/or investors may often rely on various company data to make their investment decision. In addition to finance data, environmental, social and governance (ESG) data has been widely used in analyzing company performance. However, ESG data often comes in incomplete or unbalanced datasets. For example, salary data of smaller private companies can often be less transparent, resulting in missing data entries in the ESG data spreadsheet. For another example, energy management data of companies can often be missing intermittently throughout a reporting period. Thus, the missing ESG data entries pose a challenge in systematic investments when an investment system ought to compare all investment companies on a financially material attribute.

Therefore, there is a need to address the issue of missing data entries in ESG data.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

As used herein, the term "substantially" refers to a characteristic that achieve a certain property for the most part. For example, a set of variables that maximizes a numerical approximation of an objective function may be referred to as substantially maximizes the original objective function.

Control systems can often be analyzed by prediction models. To build a prediction model, training data samples are obtained, e.g., from historical measurements and/or observations of the control system, each of which includes an input sample and a corresponding output sample. The input sample may include a plurality of input characteristics. In another example, an evaluation model may employ data samples to valuate the performance metrics of a control system.

For example, a prediction model that predicts company performance may employ ESG data that provides information on the environmental, social, and governance factors of a company and may be used to measure how ethically viable and sustainable company operations are. Example environmental data of a company may include climate change data, greenhouse gas emissions data, waste and pollution data, deforestation data, resource depletion data, and/or the like. Example social data of the company may include working conditions data, health and safety data, local communities data, employee relations and diversity data, conflicts and humanitarian crisis data, and/or the like. Example governance data of the company may include fair tax strategy data, executive pay data, bribery and corruption data, employee pay and reward data, board diversity data, and/or the like.

Due to the nature of the ESG data, available ESG data may often come in the form of incomplete or unbalanced datasets with missing data entries. Some existing systems may choose to disregard rows with missing data entries in an ESG data spreadsheet, which largely under utilizes the available ESG data in data training.

Embodiments described herein provide a data-imputation and bias-correction approach that detects and corrects missing ESG data entries for the control system. Specifically, a matrix factorization approach is adopted for key performance indicators (KPIs) in a given descriptor (a column in the ESG data spreadsheet) to impute missing ESG values. The approach may then check if the KPIs in the descriptor exhibit systematic data gaps based on a missing completely at random (MCAR) test. Conditional on the results of the MCAR test, the system may apply Heckman's bias correction to correct for biases in the imputed data.

In one embodiment, the KPIs in a given descriptor may share a few unobservable attributes, chosen by experts in the field to represent a unique ESG issue represented by the descriptor. Companies are linked by these latent attributes, and so the latent attributes can explain firm-to-firm variance in ESG data (much like style factors do for conventional risk models). The number of these hidden attributes that explain similarities between firms is smaller than the number of KPIs in the descriptor and it is much smaller than the number of companies. In this way, these hidden attributes may be extracted from the available ESG data, and together with the shared relationship between companies, to impute the missing ESG data entries.

In one embodiment, upon data imputation of missing entries, the system may then determine whether the missing data is randomly missing, or may share the same distributional properties (mean and standard deviation) as those observed, e.g., systemically missing. Companies may be grouped into two sets, one for which data is missing in a given KPI and the other for which data is available. The two groups of companies may be used to test for difference in central tendencies for all other KPIs in the descriptor. Based on the tested difference, it may be inferred whether data in that descriptor is missing at random or systemically.

In one embodiment, if data is missing systematically, the latent attributes to explain the systemic "missingness" may be determined. For example, based on priors these attributes are possibly sector, region or size differences between firms, given that regulatory requirement and relevance for disclosure can vary along these dimensions. By regressing along these attributes, a number may be assigned to the likelihood of missingness. Heckman correction may then be applied to adjust the imputed values for disclosure bias.

Figure 1:
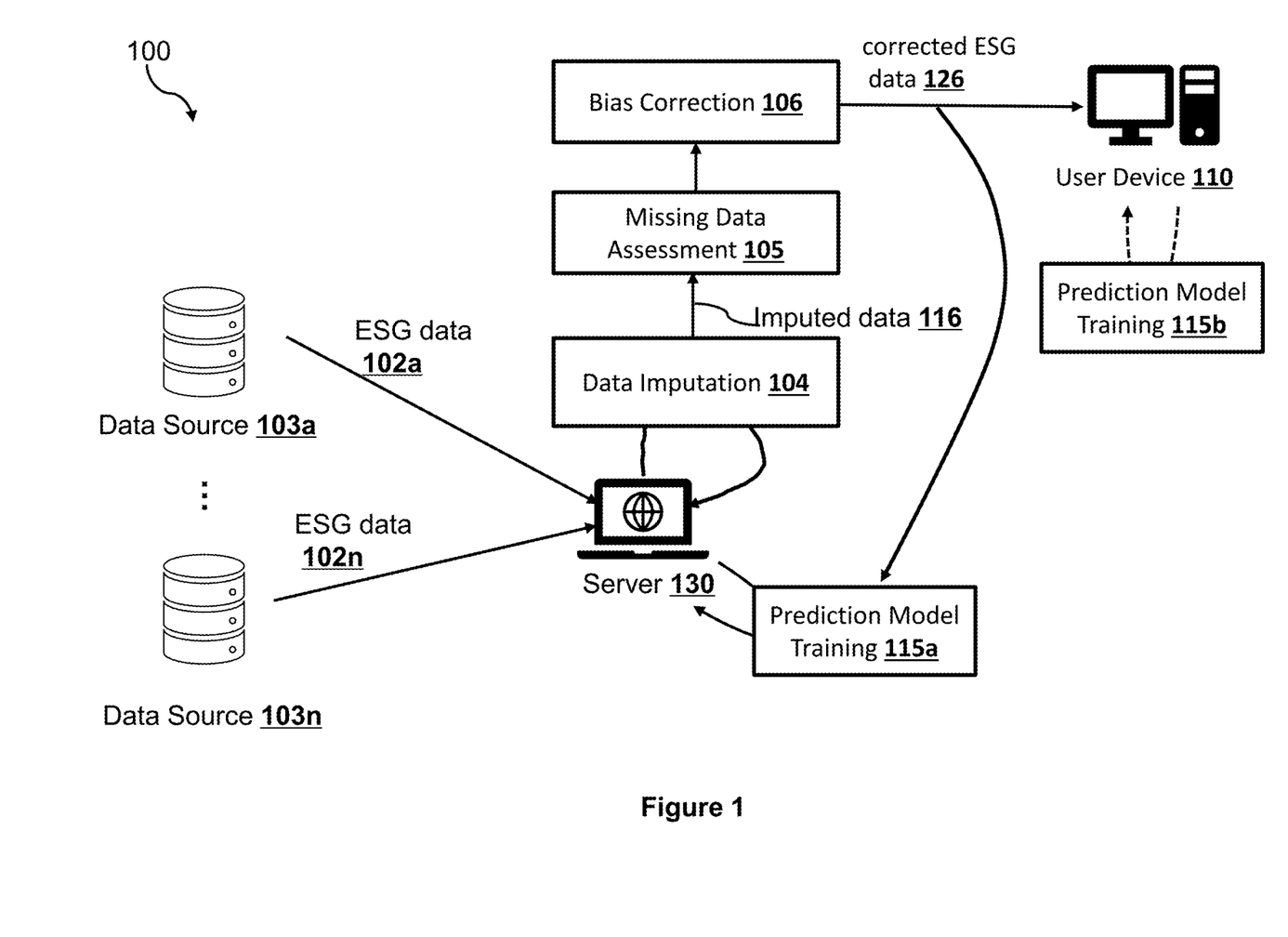
FIG. 1 provides a block diagram illustrating example data flows among a framework of various entities for implementing a prediction model with varying levels of data availability, according to embodiments described herein.

FIG. 1 provides a block diagram illustrating example data flows among a framework of various entities for implementing a missing data imputation for ESG data, according to embodiments described herein. Diagram 100 shows a server 130, various data sources 103a-n, a user device 110, and/or the like interact with each other, e.g., via a communication network. In diagram 100, the number of data sources 103a-n, are shown for illustrative purposes, while any number of databases may be communicative with the server 130.

In one embodiment, the server 130 may receive ESG data 102a-n relating to one or more companies from data sources 103a-n via a communication network. For example, the data source 103a-n may include data vendors such as Bloomberg®, S&P® DJI, ISS Oekom, and/or the like. The data 102a-n may include ESG data including information on the environmental, social, and governance factors of a number of target companies and may be used to measure how ethically viable and sustainable company operations are. Example environmental data of a company may include climate change data, greenhouse gas emissions data, waste and pollution data, deforestation data, resource depletion data, and/or the like. Example social data of the company may include working conditions data, health and safety data, local communities data, employee relations and diversity data, conflicts and humanitarian crisis data, and/or the like. Example governance data of the company may include fair tax strategy data, executive pay data, bribery and corruption data, employee pay and reward data, board diversity data, and/or the like.

In one embodiment, the server 130 may receive the ESG data 102a-n in the form of a database file, such as a spreadsheet, and/or the like. The server 130 may host a data imputation 104 to impute missing data entries in the ESG data spreadsheet. For example, the ESG data 102a-n may be received in a batch in the form of a spreadsheet having rows representing a plurality of companies, and columns representing different ESG data attributes (e.g., salary, diversity, carbon footprint, and/or the like). For each row (company), one or more data entries corresponding to one or more ESG data attributes may be missing. Or for each column (ESG data descriptor), some company data may not be available. In that case, the data imputation module 104 may impute the values of the missing data entries based on available entries, e.g., using a prediction model that learns the shared relationships between companies and known ESG data attributes.

In one embodiment, the data imputation module 104 may generate imputed data 116, based on which the missing data assessment module 105 may determine whether the missing data entries are randomly missing, or may share the same distributional properties (mean and standard deviation) as those observed, e.g., systemically missing. For example, the target companies (all rows) may be grouped into two sets: the first set having companies that miss data entries relating to a key performance indicator, and the second set having companies that have data entries available for the key performance indicator. The two groups of companies may be used to test for difference in central tendencies for other KPIs. Based on the tested difference, it may be inferred whether data in that descriptor is missing at random or systemically.

In one embodiment, a bias correction module 106 may be employed to generate latent attributes according to the missing data entries, if data is missing systematically. For example, these latent attributes are possibly sector, region or size differences between firms, given that regulatory requirement and relevance for disclosure can vary along these dimensions. By regressing along these attributes, a number may be assigned to the likelihood of missingness. Heckman correction may then be applied to adjust the imputed values for disclosure bias. The corrected ESG data 126 post bias correction may then be used for prediction model training 115a at the server 130. Or the corrected ESG data 126 may be optionally output to a user device 110, on which prediction model training 115b may be deployed.

Figure 2:
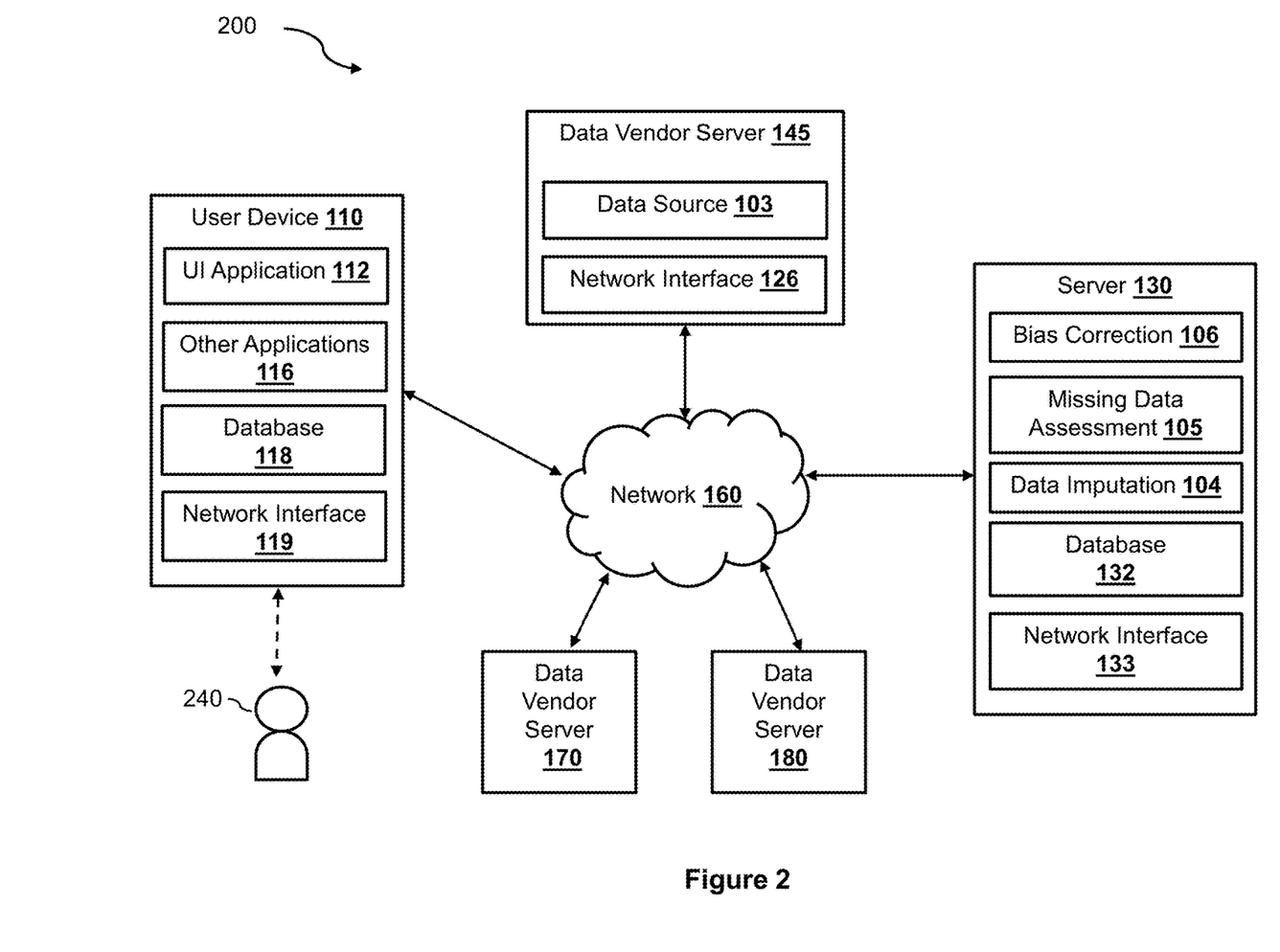
FIG. 2 is a block diagram of a networked system suitable for implementing the framework described in FIG. 1 and other embodiments described herein, according to an embodiment.

FIG. 2 is a block diagram of a networked system suitable for implementing the framework described in FIG. 1 and other embodiments described herein, according to an embodiment. In one embodiment, block diagram 200 shows a system including the user device 110 which may be operated by user 240, data vendor servers 145, 170 and 180, server 130, and other forms of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server-based OS. It can be appreciated that the devices and/or servers illustrated in FIG. 2 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 110, data vendor servers 145, 170 and 180, and the server 130 may communicate with each other over a network 160. User device 110 may be utilized by a user 240 (e.g., a driver, a system admin, etc.) to access the various features available for user device 110, which may include processes and/or applications associated with the server 130 to receive an output data anomaly report.

User device 110, data vendor server 145, and the server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 160.

User device 110 may be implemented as a communication device that may utilize appropriate hardware and software configured for wired and/or wireless communication with data vendor server 145 and/or the server 130. For example, in one embodiment, user device 110 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 110 of FIG. 2 contains a user interface (UI) application 112, and/or other applications 116, which may correspond to executable processes, procedures, and/or applications with associated hardware. For example, the user device 110 may receive a message indicating a predicted value for a control system (e.g., 116 in FIG. 1) from the server 130 and display the message via the UI application 112. In other embodiments, user device 110 may include additional or different modules having specialized hardware and/or software as required.

In various embodiments, user device 110 includes other applications 116 as may be desired in particular embodiments to provide features to user device 110. For example, other applications 116 may include security applications for implementing client-side security features, programmatic client applications for interfacing with appropriate application programming interfaces (APIs) over network 160, or other types of applications. Other applications 116 may also include communication applications, such as email, texting, voice, social networking, and IM applications that allow a user to send and receive emails, calls, texts, and other notifications through network 160. For example, the other application 116 may be an email or instant messaging application that receives a message containing corrected ESG data from the server 130. Other applications 116 may include device interfaces and other display modules that may receive input and/or output information. For example, other applications 116 may contain software programs for asset management, executable by a processor, including a graphical user interface (GUI) configured to provide an interface to the user 240 to view a report of corrected ESG data 126.

User device 110 may further include database 118 stored in a transitory and/or non-transitory memory of user device 110, which may store various applications and data and be utilized during execution of various modules of user device 110. Database 118 may store user profile relating to the user 240, predictions previously viewed or saved by the user 240, historical data received from the server 130, and/or the like. In some embodiments, database 118 may be local to user device 110. However, in other embodiments, database 118 may be external to user device 110 and accessible by user device 110, including cloud storage systems and/or databases that are accessible over network 160.

User device 110 includes at least one network interface component 119 adapted to communicate with data vendor server 145 and/or the server 130. In various embodiments, network interface component 119 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 145 may correspond to a server that hosts one or more of the databases 103*a-n* (or collectively referred to as 103) to provide data 102*a-n* to the server 130. The database 103 may be implemented by one or more relational database, distributed databases, cloud databases, and/or the like.

The data vendor server 145 includes at least one network interface component 126 adapted to communicate with user device 110 and/or the server 130. In various embodiments, network interface component 126 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 145 may send ESG data from the database 103, via the network interface 126, to the server 130.

The server 130 may be housed with the data imputation module 104, bias correction module 106 and the missing data assessment module 105. In some implementations, modules 104-106 may receive data from database 103 at the data vendor server 145 via the network 160 and build or implement a prediction model such as a regression model and/or a machine learning model to generate a imputed value for missing ESG data entries. The generated value may further be corrected by the bias correction module 106, and the data results 126 is sent to the user device 110 for review by the user 240 via the network 160.

The database 132 may be stored in a transitory and/or non-transitory memory of the server 130. In one implementation, the database 132 may store data obtained from the data vendor server 145. In one implementation, the database 132 may store parameters of the base prediction model 115. In one implementation, the database 132 may store previously predicted values generated from the prediction generation module 106, and the corresponding input feature vectors.

In some embodiments, database 132 may be local to the server 130. However, in other embodiments, database 132 may be external to the server 130 and accessible by the server 130, including cloud storage systems and/or databases that are accessible over network 160.

The server 130 includes at least one network interface component 133 adapted to communicate with user device 110 and/or data vendor servers 145, 170 or 180 over network 160. In various embodiments, network interface component 133 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 200.

Figure 3:
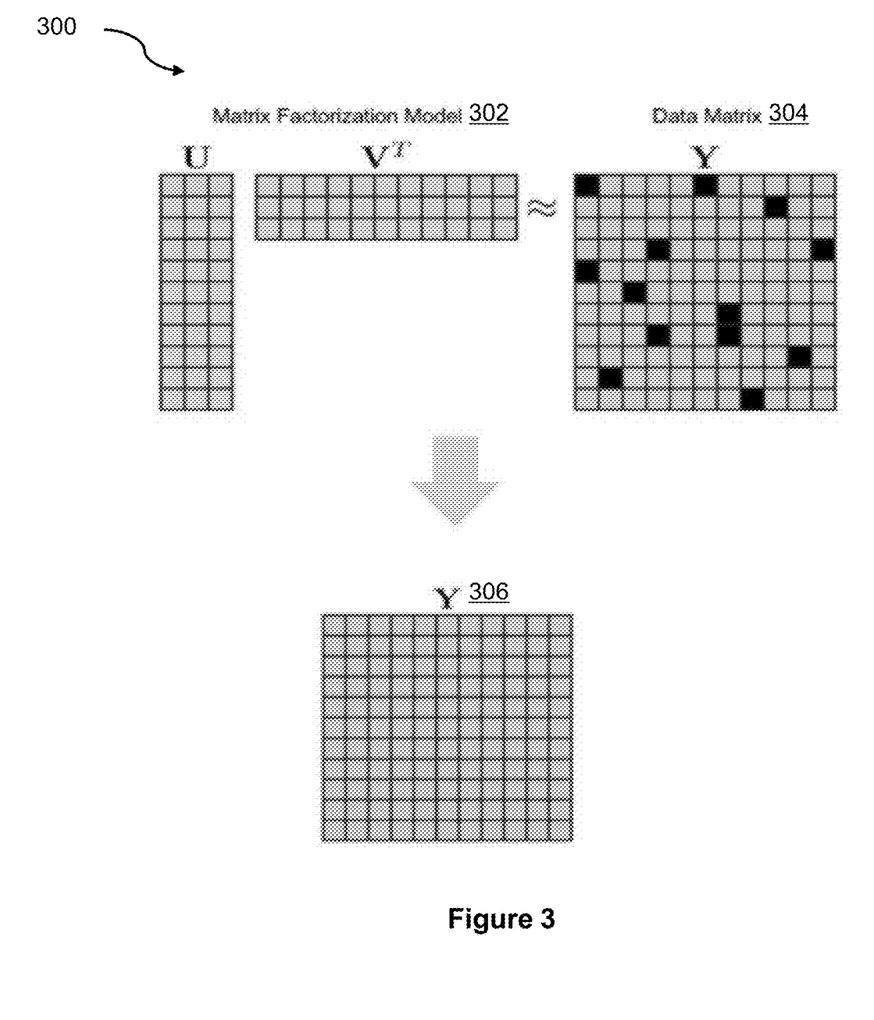
FIG. 3 is a simplified diagram illustrating an example aspect of ESG data imputation for missing data entries, performed by the data imputation module in FIGS. 1-2, according to embodiments described herein.

FIG. 3 is a simplified diagram 300 illustrating an example aspect of ESG data imputation for missing data entries, e.g., performed by the data imputation module 104 in FIGS. 1-2, according to embodiments described herein. In one embodiment, ESG data may be received in a form of a data matrix 302, which may be a sparse matrix of size m×n where m is the number of independent users (e.g., company names) and n is the number of features (e.g., different types of ESG data). Specifically, for ESG data, m is the number of companies in the universe and n is the number of key performance indicators (KPIs).

In one embodiment, sparsity of the data matrix 302 can range from 25-90%. For example, missingness of sustainable information may be related to Region (APAC companies have more missing values than EMEA), company size (small caps have more missing values than large caps), sector (Utility and Energy sectors have more coverage in descriptors related to energy production), and data vendor.

In one embodiment, a missing value in the data matrix 302 may be estimated using known ratings made by the same user (company) on similar items (columns). A variant (the transposed problem) is based on similarity of items. Key to these approaches is a set of similar values $\Omega^k(i,j)$. This is the set of k-neighbors for user i and item j in the data matrix 302, the imputed value for the missing $a_{i,j}$ is given by:

$$\hat{a}_{i,j} = \frac{\sum_{k \in \Omega^k} w_{kj} a_{kj}}{\sum_{k \in \Omega^k} w_{kj}}$$

where $W_{k,j}$ is a weight representing the relative importance of $a_{k,j}$. For example, the weights may be determined by the priority weights of the KPI and the $\Omega^k(i,j)$ set includes all other KPIs in the same descriptor. However, this neighborhood model may face a common problem that they do not provide the flexibility to distinguish between the weights and user preference.

As shown in diagram 300, the latent factor model (LMF) are adopted to perform matrix factorization 304 on the data matrix 302. The LMF improves upon the deficiency of the neighborhood models by introducing latent factors to differentiate between user preference (user factors) and item importance (item factors). Specifically, as the incomplete data, represented by the sparse data matrix 302, can often be mapped into a small dimensional space (a low rank) and the original matrix can be recomputed to recover the missing values.

In one embodiment, the objective of the LMF approach is to find the latent matrices U of size (m×k) and V of size (k×n) such that k<<m, n such that the original data matrix 302 $Y=UV^T$. The latent matrix V represents the mapping to a small group of representative companies (or representative users) and the matrix U represents a small group of representative KPIs (or representative items). It is noted that there is noise in the data matrix 302, the overfitting (to noise) may be controlled using a regularization penalty.

In one embodiment, a neural model may be engaged to generate the latent matrices U and V based on an input of the matrix the original data matrix Y. The neural model may be trained by a loss that minimizes the element-wise error between Y and $UV^T$, and a regularization term. The objective function to train the LMP model is therefore:

$$\min \sum_{missing\ a_{ij}} (a_{ij} - u_i^T v_j)^2 + \lambda(\|u_i\|_2^2 + \|v_i\|_2^2)$$

where the regularization term uses a norm 2. $\|u_i\|_2^2 = (\sum_j x_{ij}^2)^{1/2}$ and a scalar factor implying the strength of regulation. Thus, in matrix form, the objective is computed as:

$$\min_{U,V} \|A - UV\|_F^2 + \lambda(\|U\|_F^2 + \|V\|_F^2)$$

where A denotes the sparse data matrix 302. In this way, when the factorized matrices U and V are located according to the objective, the imputed data matrix Y 306 may be obtained by the multiplication of U and V. The missing entries in the original data matrix 302 are thus imputed.

Figure 4:
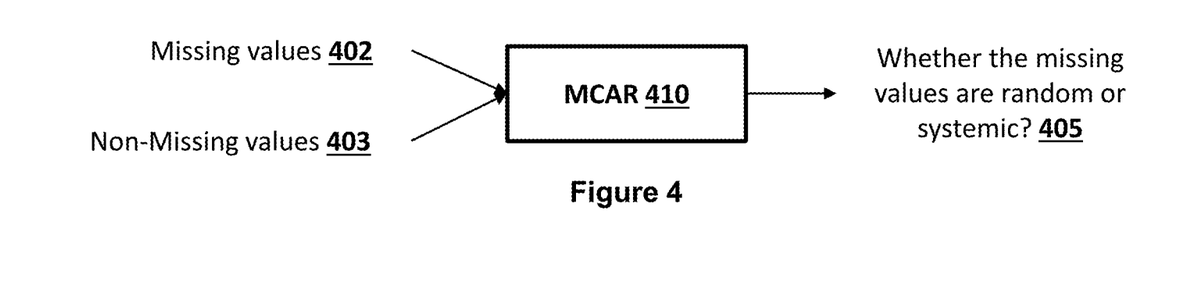
FIG. 4 is a simplified diagram illustrating an example aspect of assessing whether missing data is random or systemic performed by the missing data assessment module in FIGS. 1-2, according to embodiments described herein.

FIG. 4 is a simplified diagram 400 illustrating an example aspect of assessing whether missing data is random or systemic, e.g., performed by the missing data assessment module 105 in FIGS. 1-2, according to embodiments described herein.

For example, ESG data is primarily based on company disclosures. Corporate disclosures are subject to regulation and so unless the policy of the land necessitates a disclosure companies would not necessarily take on the regulatory risk upon them. The lack of disclosure may often be amplified by the fact that collecting, aggregating and reporting information on ESG issues require administrative expenses that small firms often cannot afford. Therefore, it is likely that sometimes there is more data from certain countries, sectors and bigger companies than otherwise. Thus, under such conditions where the observation is incomplete, inferences drawn, and parameters extracted from the observations may not represent the true value. Therefore, to determine whether the inferences are possibly biased, the missing data assessment module 105 assess whether the gaps in the data entries are random or systemic.

In one embodiment, the missing values 402 and non-missing values 403 may be passed to a Missing Completely At Random (MCAR) test 410. The MCAR test assumes that null hypothesis states missing values are totally random. For example, for every KPI in a descriptor (column), the MCAR test 410 splits companies (rows) into two groups: the first with existing data values for the KPI and the second without (values missing). The MCAR test 410 then estimates the means and covariances of the two groups using the other KPIs.

Specifically, given the two multivariate distributions (missing vs. non-missing), the MCAR test 410 tests whether the means of two distributions are statistically different. When the two means are determined to be statistically indifferent, the missing data is determined to be missing completely random. On the other hand, when a p-value (based on observed missing data values, assuming the null hypothesis is true) is less than a threshold (e.g., 0.04, 0.05, etc.), strong statistical significance of difference is implied—the missing data is not missing at random.

Figure 5:
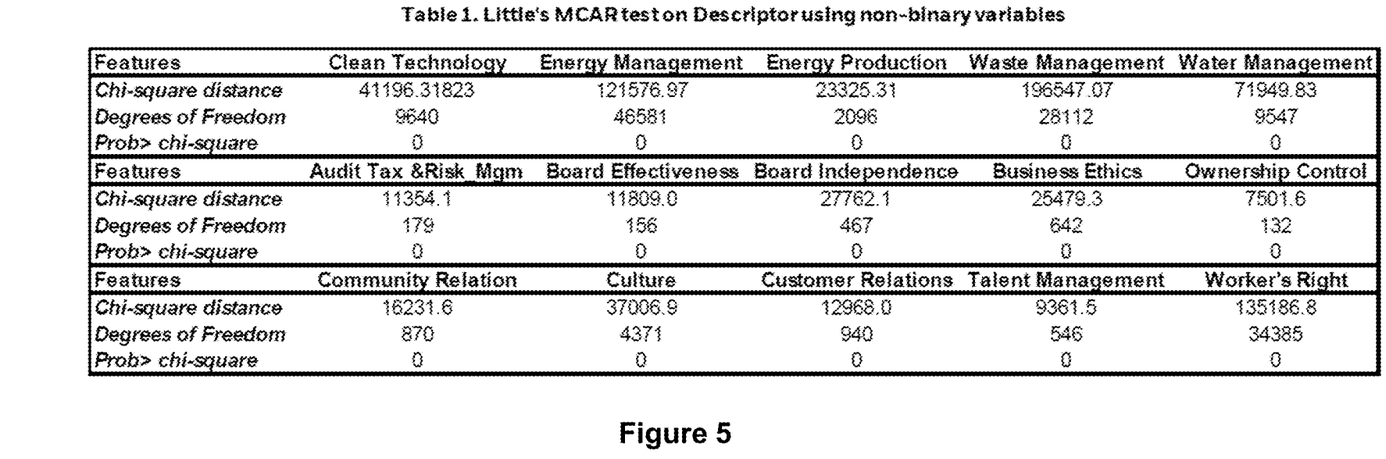
FIG. 5 is an example data table showing example data test results on descriptors using non-binary variables, according to embodiments described herein.

FIG. 5 is an example data table showing example data test results on descriptors using non-binary variables, according to embodiments described herein. The MCAR test 410 is performed for every KPI in the Energy Management (EM) descriptor. As shown in Table 1, the p-value (probability of obtaining a chi-square as large or larger than that in the data experiment and the data still supports the null hypothesis) is zero, implicating the data is not missing at random under the EM descriptor.

Figure 6:
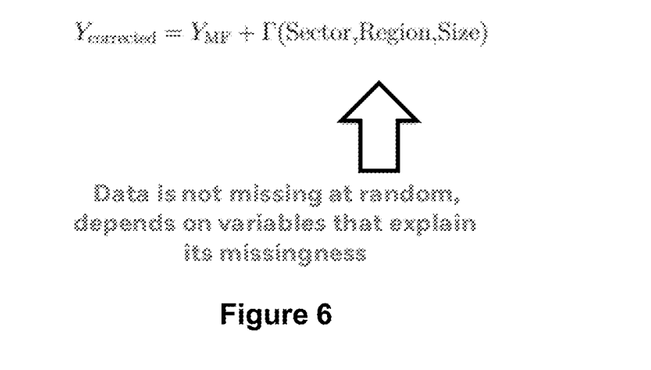
FIG. 6 is a simplified diagram illustrating an example aspect of data bias correction after determining whether the missing data is systemically missing performed by the bias correction module in FIGS. 1-2, according to embodiments described herein.

FIG. 6 is a simplified diagram 600 illustrating an example aspect of data bias correction after determining whether the missing data is systemically missing, e.g., performed by the bias correction module 106 in FIGS. 1-2, according to embodiments described herein. When the missing data is missing systemically, the bias correction module 106 may adopt the Heckman's approach to explicitly model the section mechanism, using latent variables to explain why an observation is missing or not (observable or not observable).

Figure 7:
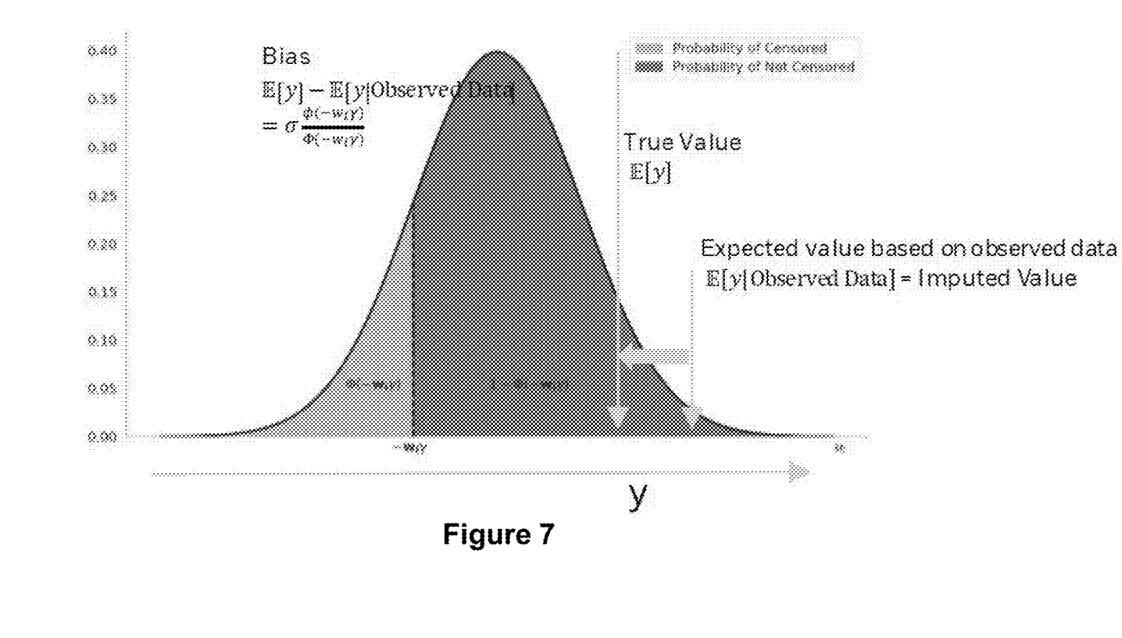
FIG. 7 is an example data plot illustrating the bias in the missing data, according to embodiments described herein.

For example, assuming the missing data point is a random variable ('y'). The imputed value using the method discussed in relation to FIG. 3 is likely to suffer from sample selection bias because the data observed may be censored systematically. FIG. 7 is an example data plot illustrating the bias in the missing data. As shown in FIG. 7, if the population of the random variable ('y') representing the missing data is observed, the distributions of the censored and non-censored data is shown. The missing data pointy is observed if it is above a certain threshold (the dotted line below) and censored otherwise. The imputed value for missing data pointy is the conditional mean of the random variable. Using Heckman's test, the bias term may be computed as the difference between the true value of variable $\gamma$ and the expected value of $\gamma$ based on the observed (non-missing) data, i.e., the imputed data:

$$E[y] - E[y \mid \text{observed data}] = \sigma \frac{\phi(-w_i\gamma)}{\Phi(-w_i\gamma)}$$

where $\phi(\ )$ is the probability density function of the observed data; $w_i$ is a vector of the attributes of the company which explain the probability of missingness; $\gamma$ is a vector of parameters for each variable in the vector $w_i$; and $\sigma$ is the standard deviation of errors in the missing variable estimation (e.g., FIG. 3). Therefore, in other words, the probability that a company has missing data depends on the size of the company (e.g., whether it is a small size), region (e.g., whether it is in developing countries) and GICS sector. $w_{i\gamma}$ is a weighted sum of parameters and attributes that together give the probability that a company might have missing data. The probability function $$\frac{\phi(-w_i\gamma)}{\Phi(-w_i\gamma)}$$

is also called the inverse mills ratio.

For example, if the left tail of the distribution is censored, then the sample mean from the rest of the data (dark area) is going to be higher than the true value. The difference between the guessed value (sample mean) and the true value (population mean) is the sample selection or censorship bias. This censorship bias in the imputed values may be corrected using the correction term computed from the Heckman's method.

Specifically, assuming that there are a set of explanatory variables in the data matrix 302, the exposure to which decides if the data from a company will be disclosed or censored. Referring back to the example shown in FIG. 6, variables such as region, sector and size are used. Thus, censorship may occur in small sized companies, companies in regions with low regulatory requirement for disclosure and companies in sector with high environmental footprint.

In one embodiment, censorship is converted into a binary variable:

$$z = \begin{cases} 1, & \text{disclosed} \\ 0, & \text{censored} \end{cases}$$

Using a probit regression with 'z' as the dependent variable and the sector, region and size as independent variables, a threshold below which data is likely to be censored (e.g., see the dotted line in FIG. 7) may be estimated. A likelihood of "missingness" from the probit-regression may also be obtained. This is because, the mean of a truncated normal distribution (as in FIG. 7) is higher than the mean of the non-truncated normal distribution by the inverse Mills ratio (additional details of the Mills ratio can be found in Tobin [1958]). Therefore, by modeling the conditional probability that an observation is included in the sample, the bias in the conditional mean to get the unconditional mean can be corrected.

In one embodiment, Heckman correction is applied to the conditional mean (in this case the conditional mean is the imputed value). As shown in FIG. 6, these variables are the sectors, the regions, and the size factor of the company. Then the corrected data Y may be computed as:

$$Y_{corected} = Y_{MF} + \Gamma(\text{Sector, Region, Size})$$

where $\Gamma$(Sector, Region, Size) is the bias term to correct the gap between the imputed values of missing data and the true values. It is worth noting that the explanatory variables (sector, region, size) need to be complete. In other words, the explanatory variables are both for observed and unobserved data.

Figure 8:
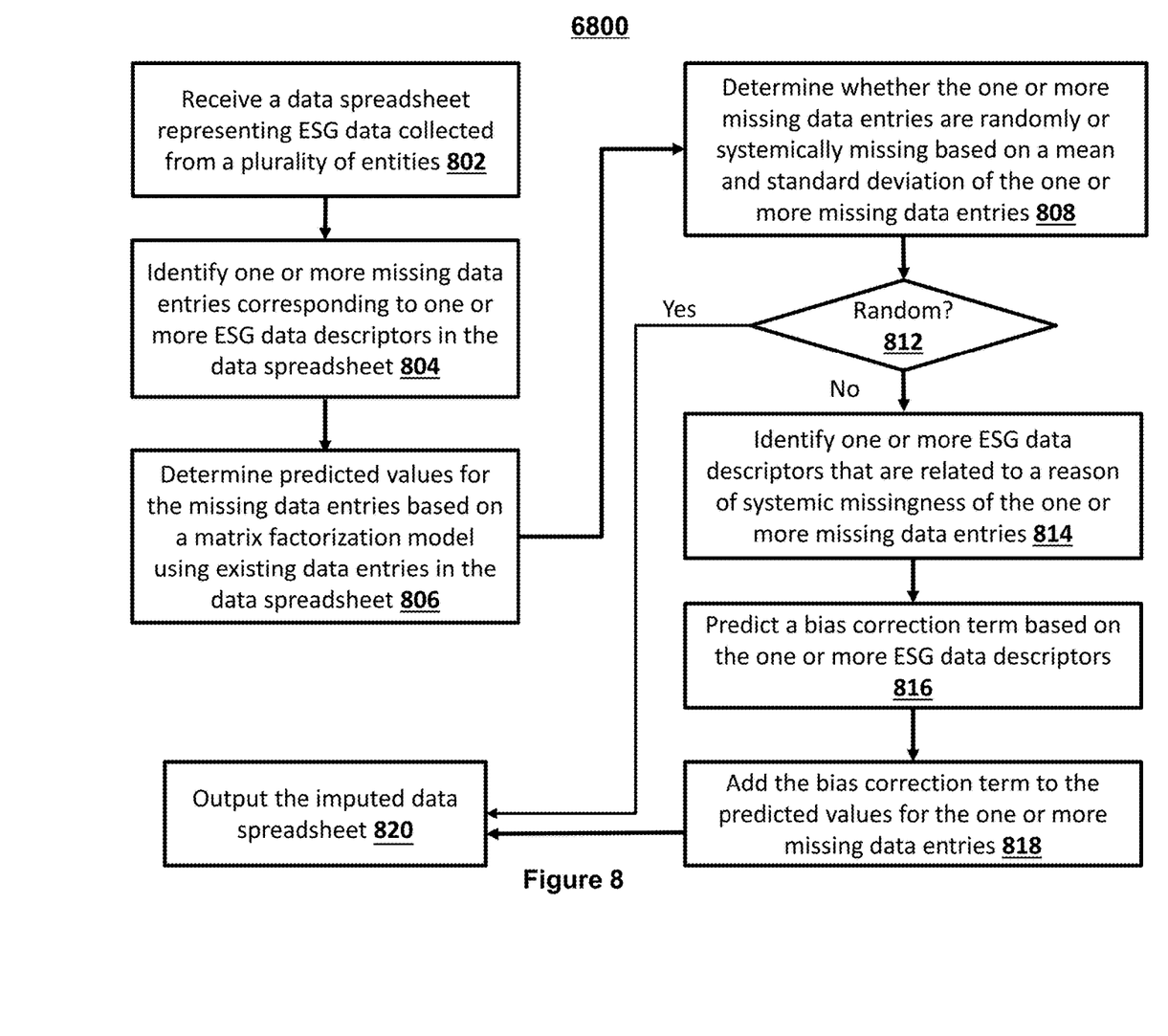
FIG. 8 is a logic flow diagram of an exemplary process for generating a data matrix of ESG data, according to an embodiment described herein.

FIG. 8 is a logic flow diagram of an exemplary process for generating a data matrix of ESG data, according to an embodiment described herein. One or more of the processes 800 may be implemented, at least in part, in the form of executable code stored on non-transitory, tangible, machine-readable media that when run by one or more processors may cause the one or more processors to perform one or more of the processes. In some embodiments, process 00 may be performed by the data imputation module 104, missing data assessment module 105, and bias correction module 106 at server 130 in FIGS. 1-2. It is worth noting that additional processes, steps and/or implementations may be omitted, performed in a different sequence, or combined as desired or appropriate.

At step 802, a data spreadsheet (e.g., data matrix 304 in FIG. 3) representing ESG data collected from a plurality of entities may be received. For example, the rows in the data spreadsheet may represent a number of companies, and the columns represent different EGS data descriptors.

At step 804, one or more missing data entries corresponding to one or more ESG data descriptors in the data spreadsheet may be identified. For example, as shown in FIG. 3, the data matrix 304 may have one or more zero entries (illustrated by shaded grids).

At step 806, predicted values may be determined for the missing data entries based on a matrix factorization model using existing data entries in the data spreadsheet. For example, At step 808, the method determines whether the one or more missing data entries are randomly or systemically missing based on a mean and standard deviation of the one or more missing data entries.

At step 812, if it is determined that the missing data entries are not randomly missing, method 800 proceeds to step 814, wherein one or more ESG data descriptors that are related to a reason of systemic missingness of the one or more missing data entries are identified.

Back to step 812, if it is determined that the missing data entries are randomly missing, method 800 proceeds to step 820, where the imputed data spreadsheet is output as the corrected ESG data (e.g., 126 in FIG. 1).

At step 816, a bias correction term is predicted based on the one or more ESG data descriptors.

At step 818, the bias correction term is added to the predicted values for the one or more missing data entries.

Method 800 then concludes at step 820, where the corrected and imputed data spreadsheet is outputted to a user device and/or a data requestor (e.g., 126 in FIG. 1).

Example Data Experiments and Performance

Example data experiments may be performed on simulated data to illustrate where the gaps are created using a systematic process. The impact of systematic censorship bias and the effectiveness of the methods described in FIGS. 1-8 to correct for it using the following simulated example.

In one embodiment, a synthetic matrix A (e.g., n=5000 companies, m=20 KPIs) where each column $A_j$:

$$A_j = \beta X_j + \epsilon \text{ and } X = U*V^T \text{ where } \beta=1; \epsilon \sim \mathbb{N}(0, \sigma^2 \mathbb{I}_k)$$

The matrix A is created by multiplying two latent matrices U the company exposures and V the KPI factors such that $X=UV^T$. The value of a 2 represents the amount of random noise in the data. The latent matrices $U \sim \mathbb{N}(0, \mathbb{I}_k)$ and $V \sim \mathbb{N}(0, \mathbb{I}_k)$ were chosen such that A has a rank k=4.

Next, the sample selection mechanism may be described by the indicator variable $Z_j = 0.5 + 0.7 \times W_j + \mu$ where corr $(X_j, W_j) = 0.8$ and corr $(\epsilon, \mu) = 0.8$. In this example, $W_j$ is a latent variable (n×1) that determines if a data point in $A_j$ will be observed or not. In particular, $Z_j > 0$ then observations will be observed, therefore $A_j[Z_j < 0] = \text{NaN}$. Each column of matrix A (the data set that provided), will be constructed using a low rank structure on X and a systematic way of defining missingness capture by Z and driven by W (latent variables linked to X). The resulting Matrix A is thus a synthetic data set for KPIs with missing values.

Figure 9:
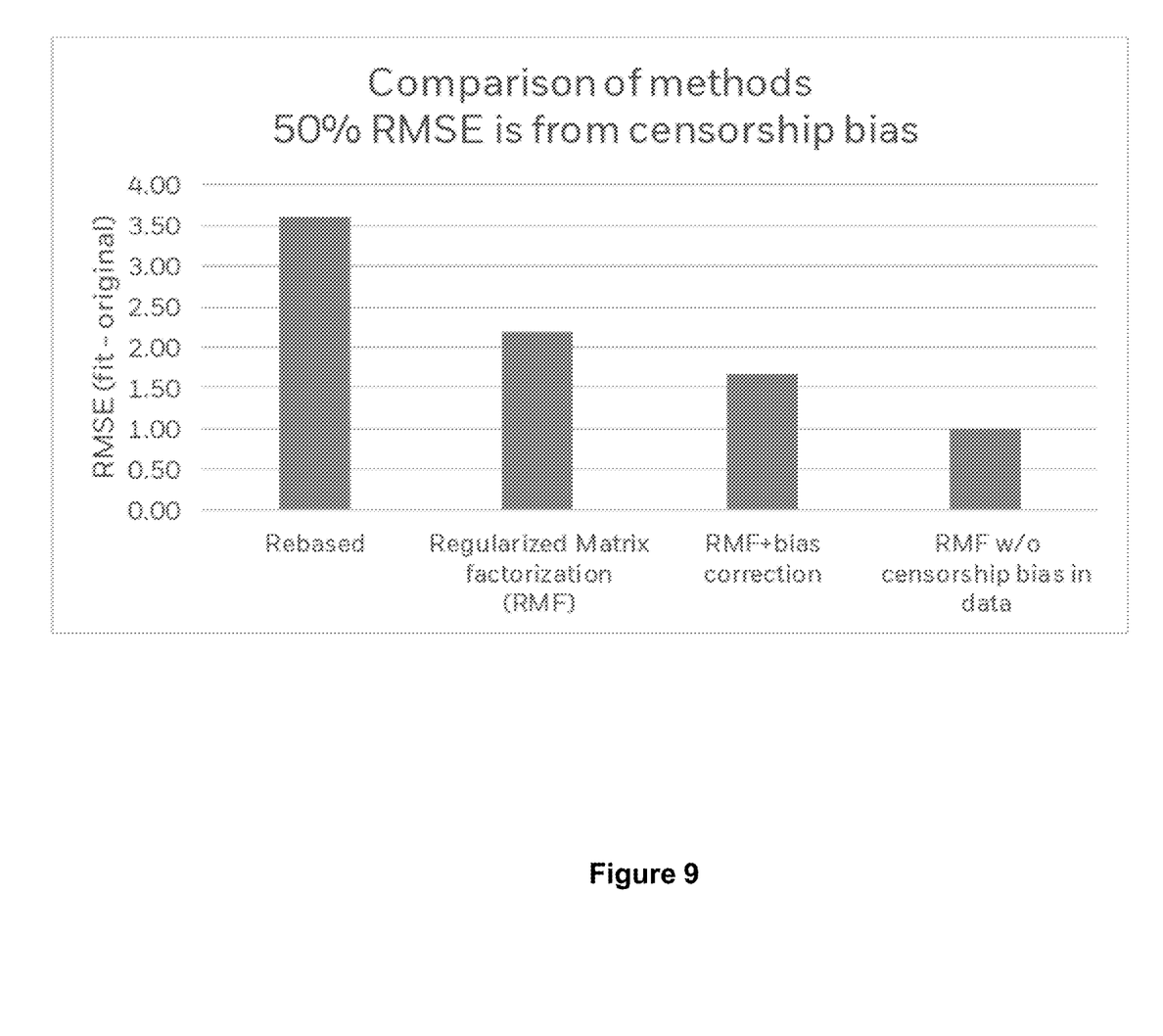
FIG. 9 is an example data plot comparing the out of sample root mean square errors (RMSEs) before and after bias correction, according to one embodiment described herein.

An MCAR test is used to show the missing values are not completely random. Then the regularized matrix factorization tis adopted to recover the missing values in the matrix A and used Heckman correction to adjust for the sample bias. FIG. 9 compares the out of sample root mean square errors (RMSEs) before and after bias correction. It is observed that the Regularized Matrix Factorization (RMF) is able to reduce the out of sample error (test-error) by 50%.

Note also if the data was simulated without censorship bias (rightmost bar), the RMF method is able to do a much better job in guessing the values. This is not just the case with RMF specifically, all methods reviewed for the data experiment can reproduce the missing data better in the absence of disclosure bias, because the gaps they intend to fill are random. In other words, 50% of the error in imputation comes from censorship bias. However, censorship is something that has been neglected by data vendors in their imputation method. Thus, the methods described in FIG. 1-8 incorporate censorship in the imputation and bias correction model to enhance the data imputation performance.

Figure 10:
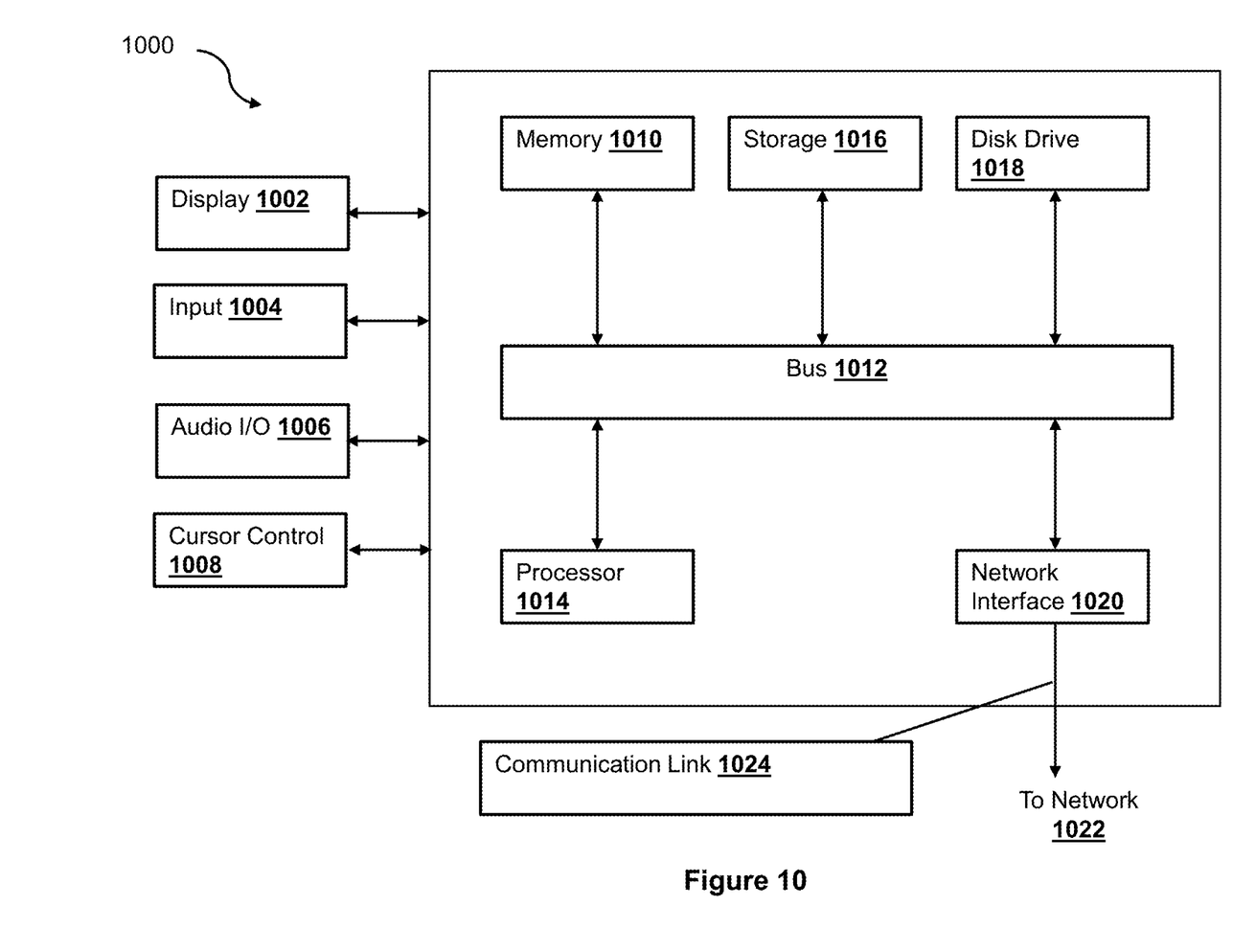
FIG. 10 is a block diagram of a computer system suitable for implementing one or more components shown in FIGS. 1-2 and performing one or more processes shown in FIGS. 3-8, according to an embodiment.

FIG. 10 is a block diagram of a computer system suitable for implementing one or more components shown in FIGS. 1-2 and performing one or more processes shown in FIGS. 3-8, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 1000 in a manner as follows.

The computer system 1000 includes a bus 1012 or other communication mechanism for communicating information data, signals, and information between various components of the computer system 1000. The components include an input/output (I/O) component 1004 that processes a user (i.e., sender, recipient, service provider) action, such as selecting keys from a keypad/keyboard, selecting one or more buttons or links, etc., and sends a corresponding signal to the bus 1012. The I/O component 1004 may also include an output component, such as a display 1002 and a cursor control 1008 (such as a keyboard, keypad, mouse, etc.). The display 1002 may be configured to present a login page for logging into a user account or a trading information page for displaying market data or portfolio data to a user. An optional audio input/output component 1006 may also be included to allow a user to use voice for inputting information by converting audio signals. The audio I/O component 1006 may allow the user to hear audio. A transceiver or network interface 1020 transmits and receives signals between the computer system 1000 and other devices, such as another user device, a merchant server, or a service provider server via network 1022. In one embodiment, the transmission is wireless, although other transmission mediums and methods may also be suitable. A processor 1014, which can be a micro-controller, digital signal processor (DSP), or other processing component, processes these various signals, such as for display on the computer system 1000 or transmission to other devices via a communication link 1024. The processor 1014 may also control transmission of information, such as cookies or IP addresses, to other devices.

The components of the computer system 1000 also include a system memory component 1010 (e.g., RAM), a static storage component 1016 (e.g., ROM), and/or a disk drive 1018 (e.g., a solid-state drive, a hard drive). The computer system 1000 performs specific operations by the processor 1014 and other components by executing one or more sequences of instructions contained in the system memory component 1010.

Logic may be encoded in a computer readable medium, which may refer to any medium that participates in providing instructions to the processor 1014 for execution. Such a medium may take many forms, including but not limited to, non-volatile media, volatile media, and transmission media. In various implementations, non-volatile media includes optical or magnetic disks, volatile media includes dynamic memory, such as the system memory component 1010, and transmission media includes coaxial cables, copper wire, and fiber optics, including wires that comprise the bus 1012. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 1000. In various other embodiments of the present disclosure, a plurality of computer systems 1000 coupled by the communication link 1024 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method for imputing missing values in Environmental, Social and Governance (ESG) data, comprising:
   receiving, by a communication interface, a data spreadsheet representing ESG data collected from a plurality of entities;
   identifying, by one or more processors, one or more missing data entries corresponding to one or more ESG data descriptors in the data spreadsheet;
   determining, by the one or more processors, predicted values for the one or more missing data entries based on a matrix factorization model using existing data entries in the data spreadsheet;
   determining, by the one or more processors, whether the one or more missing data entries are randomly or systemically missing based on a mean and standard deviation of the predicted values for the one or more missing data entries;
   in response to determining that the one or more missing data entries are systemically missing, identifying the one or more ESG data descriptors that are related to a reason of systemic missingness of the one or more missing data entries;
   predicting a bias correction term based on the one or more ESG data descriptors; and
   adding the bias correction term to the predicted values for the one or more missing data entries.

2. The method of claim 1, wherein the predicted values for the one or more missing data entries are determined by:
   generating, via a learning model, based on a data matrix representing the data spreadsheet of ESG data, a first latent matrix and a second latent matrix,
      wherein the first latent matrix has a same number of columns with the data matrix and a smaller number of rows than the data matrix, and
      the second latent matrix has a same number of rows with the data matrix and a smaller number of columns than the data matrix.

3. The method of claim 2, further comprising:
   computing an objective containing a square error between the data matrix and a matrix multiplication of the first latent matrix and the second latent matrix; and
   training the learning model based on the computed objective.

4. The method of claim 3, wherein the objective further comprises a regularization term computed by summing square values of elements in the first latent matrix and the second latent matrix that correspond to the one or more missing data entries.

5. The method of claim 1, wherein the determining whether the one or more missing data entries are randomly or systemically missing comprises:
   dividing, for a specific descriptor, rows of the data spreadsheet into a first group of existing data values and a second group of missing data values;
   estimating means and covariances of the first group and the second group; and determining a first distribution corresponding to the first group of existing data values and a second distribution corresponding to the second group of missing data values based on the estimated means and covariances.

6. The method of claim 5, further comprising:
comparing a first mean of the first distribution and a second mean of the second distribution;
in response to determining that the first mean and the second mean are statistically different, determining that the one or more missing data entries are systemically missing.

7. The method of claim 6, wherein the determination that the first mean and the second mean are statistically different is made by comparing a p-value based on observed data values that belong to descriptors having missing data values and a threshold.

8. The method of claim 1, wherein the bias correction term is computed as a difference between the mean of the predicted values of the one or more missing data entries and a conditional mean of the predicted values of the one or more missing data entries conditioned on a subset of data entries in the data spreadsheet that are not missing.

9. The method of claim 8, wherein the subset of data entries correspond to data entries that belong to ESG data descriptors of sector, region and size of a company.

10. The method of claim 1, further comprising:
generating an ESG data report using the ESG data in the data spreadsheet with imputed and corrected missing data entries.

11. A system for imputing missing values in Environmental, Social and Governance (ESG) data, comprising:
a communication interface that receives a data spreadsheet representing ESG data collected from a plurality of entities;
a memory storing a plurality of processor-executable instructions; and
one or more processors reading from the memory and executing the instructions to perform operations comprising:
identifying one or more missing data entries corresponding to one or more ESG data descriptors in the data spreadsheet;
determining predicted values for the one or more missing data entries based on a matrix factorization model using existing data entries in the data spreadsheet;
determining whether the one or more missing data entries are randomly or systemically missing based on a mean and standard deviation of the predicted values of the one or more missing data entries;
in response to determining that the one or more missing data entries are systemically missing, identifying the one or more ESG data descriptors that are related to a reason of systemic missingness of the one or more missing data entries;
predicting a bias correction term based on the one or more ESG data descriptors; and
adding the bias correction term to the predicted values for the one or more missing data entries.

12. The system of claim 11, wherein the predicted values for the one or more missing data entries are determined by:
generating, via a learning model, based on a data matrix representing the data spreadsheet of ESG data, a first latent matrix and a second latent matrix,
wherein the first latent matrix has a same number of columns with the data matrix and a smaller number of rows than the data matrix, and
the second latent matrix has a same number of rows with the data matrix and a smaller number of columns than the data matrix.

13. The system of claim 12, wherein the operations further comprise:
computing an objective containing a square error between the data matrix and a matrix multiplication of the first latent matrix and the second latent matrix; and
training the learning model based on the computed objective.

14. The system of claim 13, wherein the objective further comprises a regularization term computed by summing square values of elements in the first latent matrix and the second latent matrix that correspond to the one or more missing data entries.

15. The system of claim 11, wherein an operation of determining whether the one or more missing data entries are randomly or systemically missing comprises:
dividing, for a specific descriptor, rows of the data spreadsheet into a first group of existing data values and a second group of missing data values;
estimating means and covariances of the first group and the second group; and
determining a first distribution corresponding to the first group of existing data values and a second distribution corresponding to the second group of missing data values based on the estimated means and covariances.

16. The system of claim 15, wherein the operations further comprise:
comparing a first mean of the first distribution and a second mean of the second distribution;
in response to determining that the first mean and the second mean are statistically different, determining that the one or more missing data entries are systemically missing.

17. The system of claim 16, wherein the determination that the first mean and the second mean are statistically different is made by comparing a p-value based on observed data values that belong to descriptors having missing data values and a threshold.

18. The system of claim 11, wherein the bias correction term is computed as a difference between the mean of the predicted values of the one or more missing data entries and a conditional mean of the predicted values of the one or more missing data entries conditioned on a subset of data entries in the data spreadsheet that are not missing.

19. The system of claim 18, wherein the subset of data entries correspond to data entries that belong to ESG data descriptors of sector, region and size of a company.

20. A non-transitory processor-readable storage medium storing a plurality of processor-executable instructions for imputing missing values in Environmental, Social and Governance (ESG) data, the instructions being executed by one or more processors to perform operations comprising:
receiving a data spreadsheet representing ESG data collected from a plurality of entities;
identifying one or more missing data entries corresponding to one or more ESG data descriptors in the data spreadsheet;
determining predicted values for the one or more missing data entries based on a matrix factorization model using existing data entries in the data spreadsheet;
determining whether the one or more missing data entries are randomly or systemically missing based on a mean and standard deviation of the predicted values of the one or more missing data entries;

in response to determining that the one or more missing data entries are systemically missing, identifying one or more ESG data descriptors that are related to a reason of systemic missingness of the one or more missing data entries;

predicting a bias correction term based on the one or more ESG data descriptors; and adding the bias correction term to the predicted values for the one or more missing data entries.

\* \* \* \* \*